United States Patent [19]
McGee

[11] Patent Number: 5,595,441
[45] Date of Patent: Jan. 21, 1997

[54] PORTABLE SAFETY LIGHTING DEVICE AND METHOD FOR INCREASING VISIBILITY OF A PERSON OR VEHICLE

[76] Inventor: David I. McGee, 1729 Grand Ave., #1, St. Paul, Minn. 55105

[21] Appl. No.: 393,176

[22] Filed: Feb. 23, 1995

[51] Int. Cl.⁶ ............................................ F21V 21/14
[52] U.S. Cl. .................. 362/250; 362/72; 362/191; 362/240; 362/421; 362/427; 362/800; 340/432
[58] Field of Search ............................. 362/72, 103, 190, 362/191, 240, 249, 250, 251, 419, 421, 427, 800, 197, 199; 340/432

[56] References Cited

U.S. PATENT DOCUMENTS

| | | |
|---|---|---|
| 4,027,150 | 5/1977 | Dean . |
| 4,598,339 | 7/1986 | Ainsworth ................................ 362/72 |
| 4,782,433 | 11/1988 | Rombough . |
| 5,005,004 | 4/1991 | Udofot . |
| 5,036,442 | 7/1991 | Brown ................................. 362/191 X |
| 5,081,568 | 1/1992 | Dong et al. ......................... 362/800 X |
| 5,165,781 | 11/1992 | Orak . |
| 5,379,197 | 1/1995 | Conyers et al. ........................... 362/72 |
| 5,418,697 | 5/1995 | Chiou ........................................ 362/72 |

Primary Examiner—Stephen F. Husar
Attorney, Agent, or Firm—Merchant, Gould, Smith, Edell, Welter & Schmidt, P.A.

[57] ABSTRACT

A safety lighting device is provided which includes a base for attachment to an object and at least one elongated illuminatable section pivotably attached to the base. The elongated illuminatable section including a light source and an illuminatable tube. The light source being circuitly connectable to an energy source to provide illumination, and the illuminatable tube including a cylinder of scatter refractive material to refract illumination from the illuminatable tube. Methods for increasing visibility and apparent width are also provided.

10 Claims, 9 Drawing Sheets

PORTABLE SAFETY LIGHTING DEVICE AND METHOD FOR INCREASING VISIBILITY OF A PERSON OR VEHICLE

FIELD OF THE INVENTION

The present invention relates to a portable safety lighting device and method for increasing the visibility of a person or vehicle, and more particularly, to a portable safety lighting device having at least one elongated light illuminating section for increasing visibility thereof.

BACKGROUND OF THE INVENTION

Several bicycle headlights and taillights are presently on the market. These lights are generally designed to provide the user with two useful purposes. These purposes are, namely, to provide forward lighting which allows the cyclist to see where he or she is going, and to increase the visibility of the cyclist to both oncoming and trailing traffic. As more automobiles travel the roads, the ability to be seen is becoming increasingly important in order to avoid accidents. The bicycle headlights and taillights which are presently on the market are helpful for alerting automobile drivers to the presence of the cyclist. They fail, however, to provide adequate warning of the real width of the cyclist. Since these lights are generally positioned at the center of the bicycle, they do not provide adequate warning of the width of the bicycle which can include the handle bars and/or the cyclist's body which can extend up to about 15 inches from the center of the bicycle. On a dark night, a trailing automobile driver can easily under estimate a cyclist's true width. The result can be disastrous when an automobile sideswipes a cyclist or drives the cyclist off the road. Accordingly, it would be desirable to provide a safety lighting device which increases the apparent width of the bicycle, thereby increasing visibility.

Most commercially available bicycle headlights only provide lighting in one direction, and that direction is usually straight in front of the bicycle. As a result, potholes and debris in the path of a bicycle often goes undetected until too late. In addition, since the headlight is directed straight ahead, it is often difficult and dangerous when turning at night since the bicycle is turning into an unlighted area. Accordingly, it would be desirable to provide a safety lighting device which provides a wider dispersion of light around the bicycle, and in particular, on the front sides of the bicycle.

U.S. Pat. No. 4,027,150 describes a bicycle safety light intended to increase the profile of a cyclist by providing a dome light which extends well above the level of the bicycle. While this may increase the apparent height of a cyclist, it does not sufficiently increase apparent width.

It is recognized that essentially the same problems exist for users of motorcycles and boats, and for pedestrians and in-line skaters. The lights presently used on these objects or by these people provides an apparent width which is too narrow, and fails to adequately represent their true or real width. Accordingly, it would be desirable to provide a safety lighting device which increases apparent width for all activities at night or during darkness.

SUMMARY OF THE INVENTION

According to the present invention, a safety lighting device is provided. The safety lighting device includes a base for attachment to an object and at least one elongated illuminatable section pivotably attached to the base. The elongated illuminatable section including a light source and an illuminatable tube. The light source being circuitly connectable to an energy source to provide illumination, and the illuminatable tube including a cylinder of scatter refractive material to refract illumination from the illuminatable tube. Preferably, the elongated illuminatable section can pivot between an open position and a closed position corresponding with an "on" and an "off" position, respectively. Preferably, a releasable fastener is provided for releasably attaching the safety lighting device to an object.

The safety lighting device can include a second elongated illuminatable section pivotably attached to the base, wherein the second elongated illuminatable section includes a second light source and a second illuminatable tube. The second light source being circuitly connectable to an energy source to provide illumination, and the second illuminatable tube including a cylinder of scatter refractive material to refract illumination from the illuminatable tube. Preferably, the second elongated illuminatable section can pivot between an open position and a closed position. Preferably, elongated illuminatable section can be detached upon impact and reattached to the base without causing damage. Preferably, the safety lighting device includes a light which flashes. The flasher can provide a turning signal indication. The safety lighting device can be water resistant, and can provide variable intensity light.

According to the present invention, a safety lighting device is provided which includes a base for attachment to a person's extremity or torso, and an elongated illuminatable section pivotably attached to the base. The elongated illuminatable section includes a light source and an illuminatable tube. The light source being circuitly connectable to an energy source to provide illumination, and the illuminatable tube being a cylinder of scatter refractive material to refract illumination from the illuminatable tube.

According to the present invention, a method for increasing the visibility of a vehicle is provided. The method includes attaching a safety lighting device to a vehicle. The safety lighting device includes a base for attachment to an object and at least one elongated illuminatable section pivotably attached to the base. The elongated illuminatable section including a light source and an illuminatable tube. The light source being circuitly connectable to an energy source to provide illumination, and the illuminatable tube including a cylinder of scatter refractive material to refract illumination from the illuminatable tube. The method additionally includes attaching to a bicycle, a motorcycle, a boat, or a jet-ski. This method provides for increasing apparent width of a vehicle.

According to the present invention, a method for increasing the visibility of a person provided. The method involves attaching a safety lighting device to a person's extremity or torso. The safety lighting device includes a base for attachment to a person's extremity or torso, and an elongated illuminatable section pivotably attached to the base. The elongated illuminatable section includes a light source and an illuminatable tube. The light source being circuitly connectable to an energy source to provide illumination, and the illuminatable tube being a cylinder of scatter refractive material to refract illumination from the illuminatable tube. The elongated section can pivot between an open and a closed position which correspond to "on" and "off" positions. The method includes increasing the visibility and/or apparent width of a person on a bicycle or in-line skate.

As used herein, the phrase "apparent width" is used to describe the width of a person or object as it would be perceived by one viewing the person or object under adverse lighting conditions, such as darkness encountered at night.

DETAILED DESCRIPTION OF THE INVENTION

As required, a detailed description of preferred and alternate embodiments is presented herein. The description provided is not intended to be limiting, but rather to serve as a presentation by example of embodiments by which the subject matter claimed may be applied.

Figure 1:
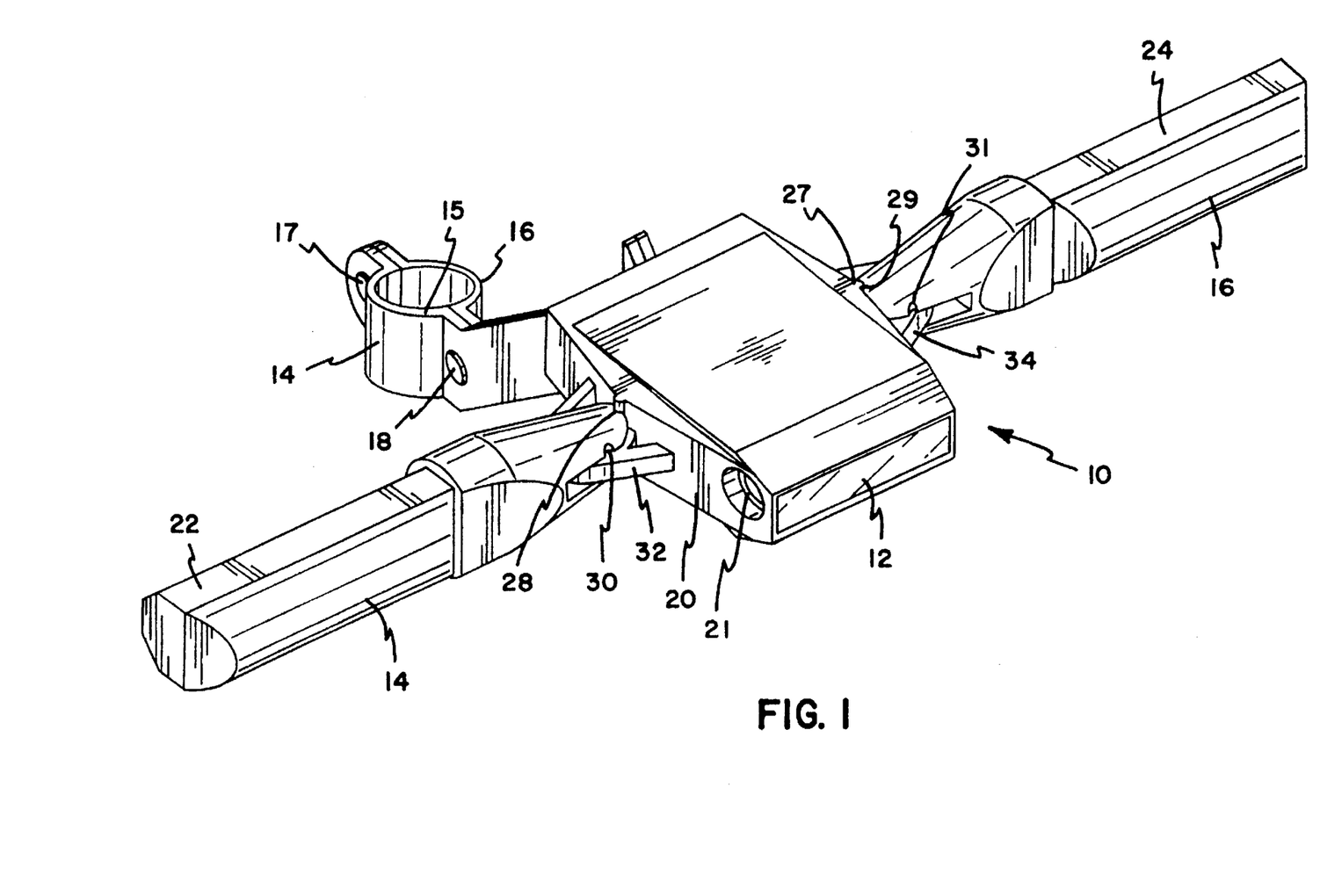
FIG. 1 is a perspective view of a forward safety lighting device for use on a bicycle according to the principles of the present invention.
Figure 2:
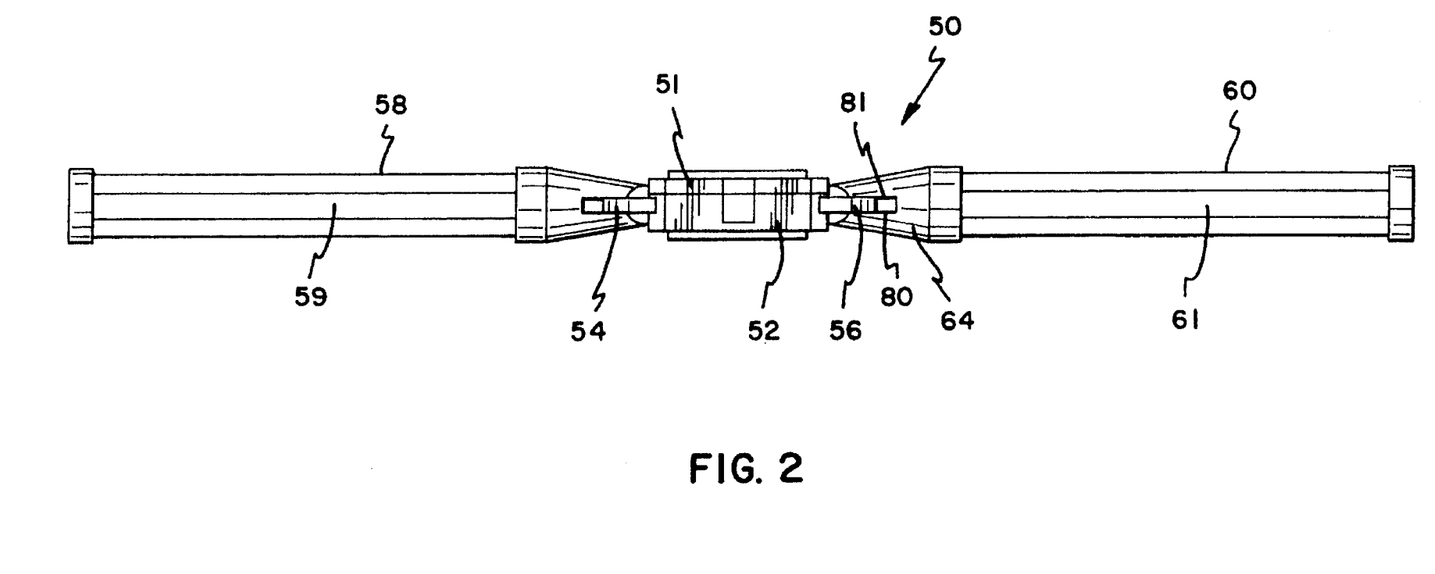
FIG. 2 is a rear view of a rear safety lighting device for use on a bicycle according to the principles of the present invention.

The reference numeral 10, FIG. 1, generally designates a forward safety lighting device 10 for use on a bicycle. The forward safety lighting device 10 includes a center headlight 12, a right side headlight 14, and a left side headlight 16 for illuminating the forward area into which a bicycle travels. It is preferred that the center headlight 12 is adapted to provide illumination primarily forward, and that the side headlights 14 and 16 are adapted to provide a scatter of light in the forward area. If desired, the direction of light can be adjusted to provide light more downward, to the sides, or some combination thereof as will be explained in more detail below. An advantage of the present invention is that the directed of light can be adjusted to provide illumination in any direction.

The forward safety lighting device 10 can be attached to the post under the handle bars of a bicycle using bracket assembly 14. As shown, bracket assembly 14 is provided by mirror parts 15 and 16 which are held together and to the bicycle post by bolts and nuts 17 and 18. By tightening or loosening bolts and nuts 17 and 18, it is possible to secure or remove, respectively, the bracket assembly 14. The bracket assembly is attached to the base unit 20 by a snap fit. The operation of the snap fit will become more evident from the views of the alternative embodiments. If desired, the bracket assembly can be more permanently attached to the base unit.

Base unit 20 includes a batteries or a battery pack therein as an energy source for running the headlights. Recharging pin hole 21 is provided for recharging the batteries. If desired, solar panels or a generator can be used to provide energy.

Adjustable right arm 22 and adjustable left arm 24 are provided and are shown in the open position or the on position. In this position, an electrical connection is provided which allows the lights to illuminate. The adjustable arms 22 and 24 are held in place by guides 26 and 27 which engage the "on" cavities 28 and 29. These cavities are referred to as "on" cavities because they allow the lights to be turned on. Also shown are "off" cavities 30 and 31 which, when engaging guides 26 and 27, respectfully, disconnect the electrical circuit which operates the lights. The adjustable arms 22 and 24 can be easily rotated forward so that "off" cavities 30 and 31 engage guides 26 and 27, respectively. Alternatively, the adjustable arms 22 and 24 can be rotated rearwardly so that "on" cavities (not shown) can engage the guides 26 and 27. Of course, the circuitry can be adjusted to accommodate a desired illumination position for the adjustable arms.

Left ear 32 and right ear 34 are provided as part of the base unit 20 and are configured to allow the adjustable right arm 22 and the adjustable left arm 24 to rotate or pivot. The range of rotation or pivoting will be demonstrated below with reference to an alternative embodiment of the present invention. The length of the forward safety lighting device 10 is preferably at least the length of the bicycle handle bars. More preferably, between 10 and 30 inches, and more preferably between 15 and 20 inches.

Now referring to FIGS. 2–8 where an alternative embodiment of the present invention is described as a rear safety lighting device 50. Rear safety lighting device 50 is intended to be attached to the post under the seat of a bicycle. The bracket assembly is not shown but is preferably identical to the bracket assembly shown in FIG. 1. Rear safety lighting device 50 includes base unit 52 which is intended to include batteries or a battery pack therein, a cover 51 which covers the base unit 52, and a left ear 54 and a right ear 56 attached as an integral part of the base unit 52. An adjustable left arm 58 is attached over the left ear 54, and an adjustable right arm 60 is attached over the right ear 56. When the rear safety lighting device 50 is "on," light illuminates from left refracting area 59 and right refracting area 61.

Figure 3:
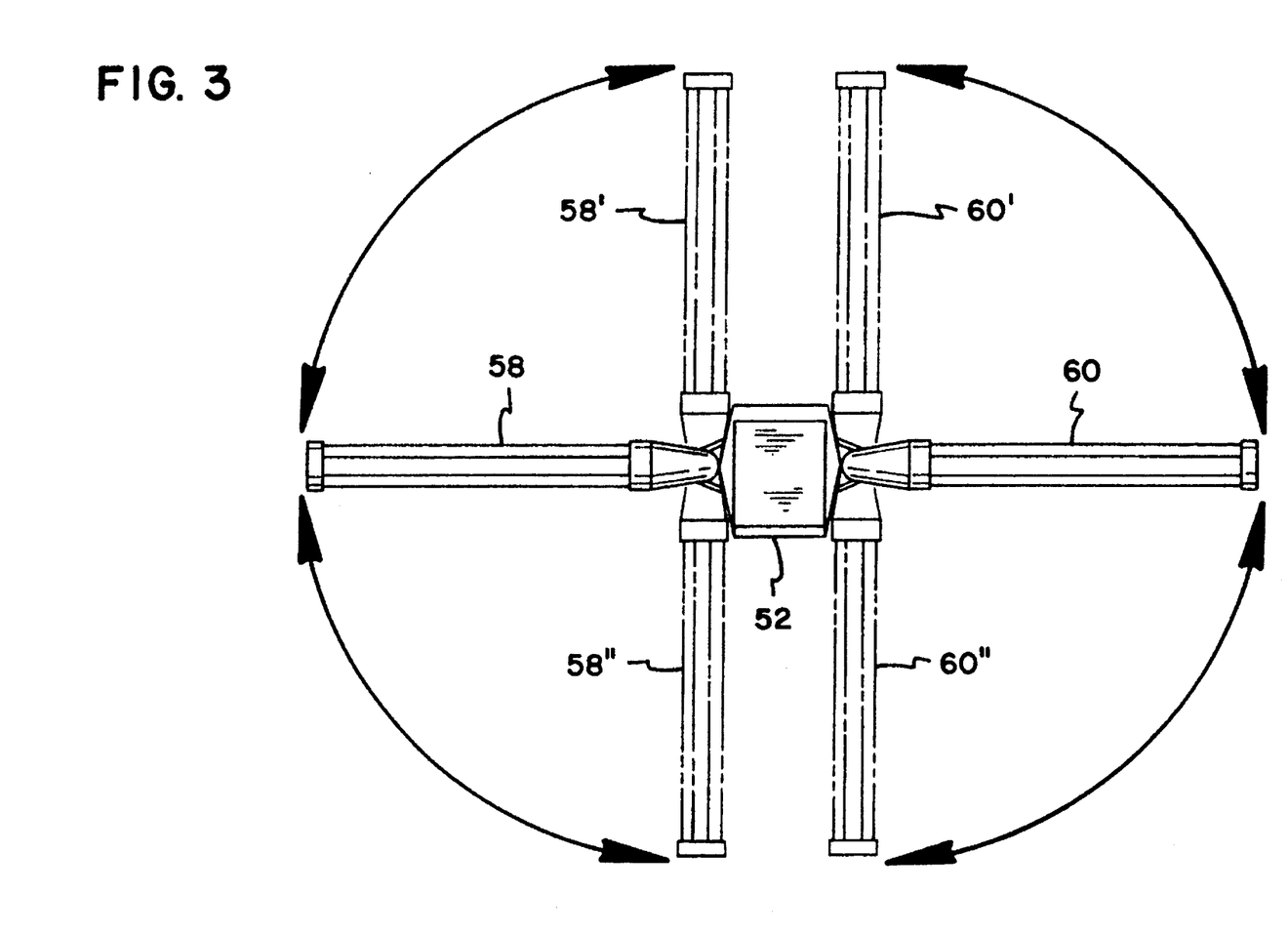
FIG. 3 is a top view of the rear safety lighting device of FIG. 2, shown in several positions.

The adjustable left arm 58 and the adjustable right arm 60 can rotate or pivot on left ear 54 and right ear 56, respectively, as demonstrated in FIG. 3. As shown, adjustable left arm 58 can be moved between rear "on" position 58' and forward "off" position 58" Similarly, adjustable right arm 60 can be moved between rear "on" position 60' and forward "off" position 60" The arrows demonstrate the relative movement of each arm relative to the base unit 52.

Figure 4:
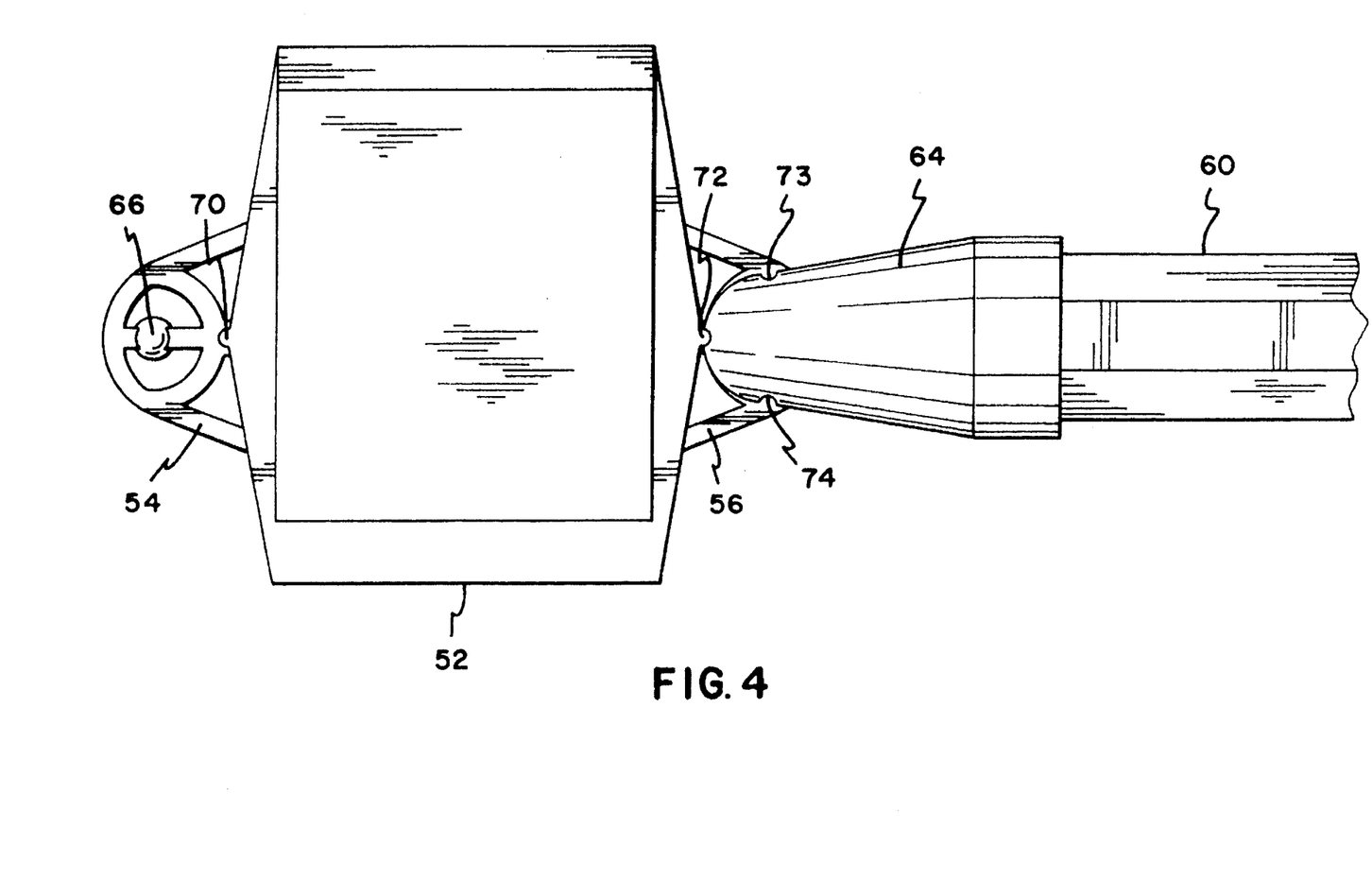
FIG. 4 is an enlarged, partial view of the rear safety lighting device of FIG. 2.

As shown in more detail in FIG. 4, right adjustable arm 60 includes right coupler 64 which over right ear 56. Right coupler 64 fits over a right raised ball (not shown) in right ear 56. Left raised ball 68 in left ear 54 is shown. Preferably, an interference fit is provided so that the couplers stay attached but can be detached from the ears if knocked. If detached, the couplers can preferably be easily reattached by hand. Accordingly, the invention provides for the arms to easily come off if desired, and be replaced with forward lights or rear lights. Advantageously, the adjustable arms are interchangeable.

Figure 5:
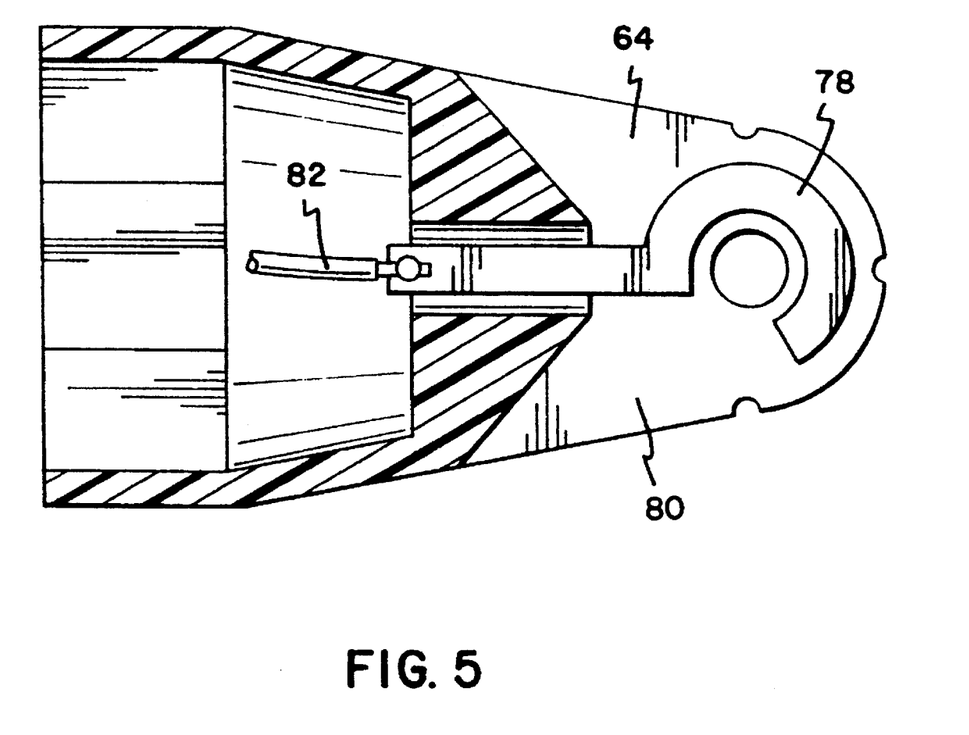
FIG. 5 is a cross-sectional view of the coupler shown in FIG. 4.
Figure 6:
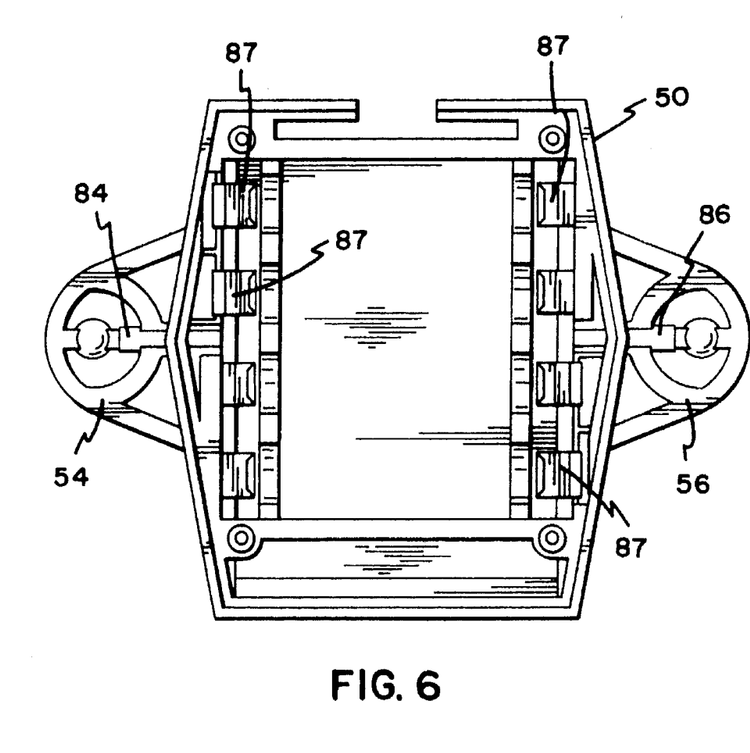
FIG. 6 is a top view of the base unit shown in FIG. 2.
Figure 7:
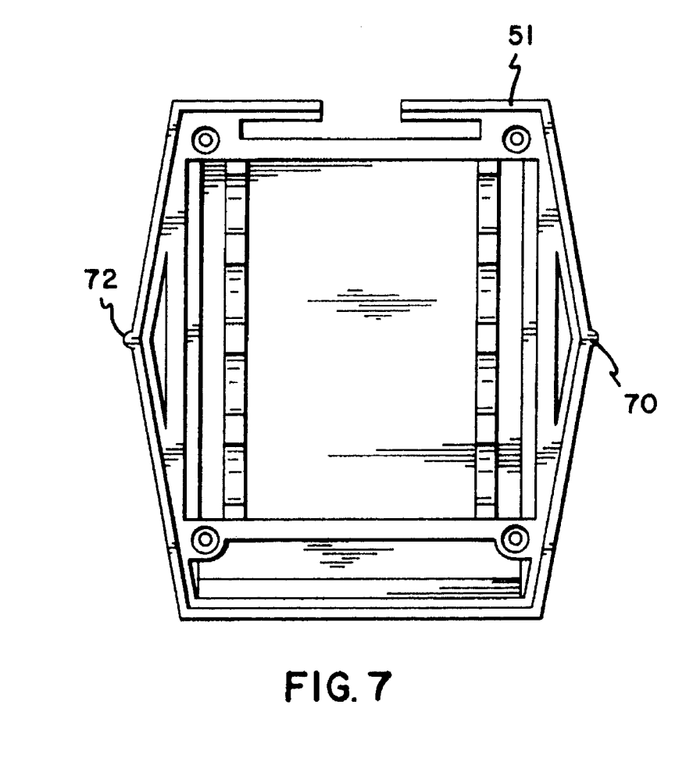
FIG. 7 is a bottom view of the cover shown in FIG. 2.

Guides 70 and 72 are provided for the adjustable arms to "on" or "off" positions. For example, adjustable right arm 60 can be rotated so that cavity 73 engages guide 72, or so that cavity 74 engages guide 72. It would be apparent to one skilled in the art, in view of the following teaching, how the various positions of the arms or the various manipulations of the arms can effect whether the device is lighted or off. As shown in FIG. 5, a discontinuous contact 78 is provided on the inner surface 80 of coupler 64. Discontinuous contact 78 is connected to lead 82 which is connected to a light. It is noted that the discontinuous contact 78 is mirrored by another contact on the opposite surface 81 of coupler 64. As shown in FIG. 6, contacts 84 and 86 are shown on ears 54 and 56, respectively. These contacts intended to be electrically connected to an energy source in base unit 50. Battery holders 87 are provided in electrical contact with contacts 84 and 86. These contacts are similarly mirrored by other contacts located on the opposite surface of the ears. Thus, when the contacts on the ears touch the contacts on the couplers, an electrical circuit is established causing the lights to go on. Similarly, when the circuit is broken, the lights go out.

Figure 8:
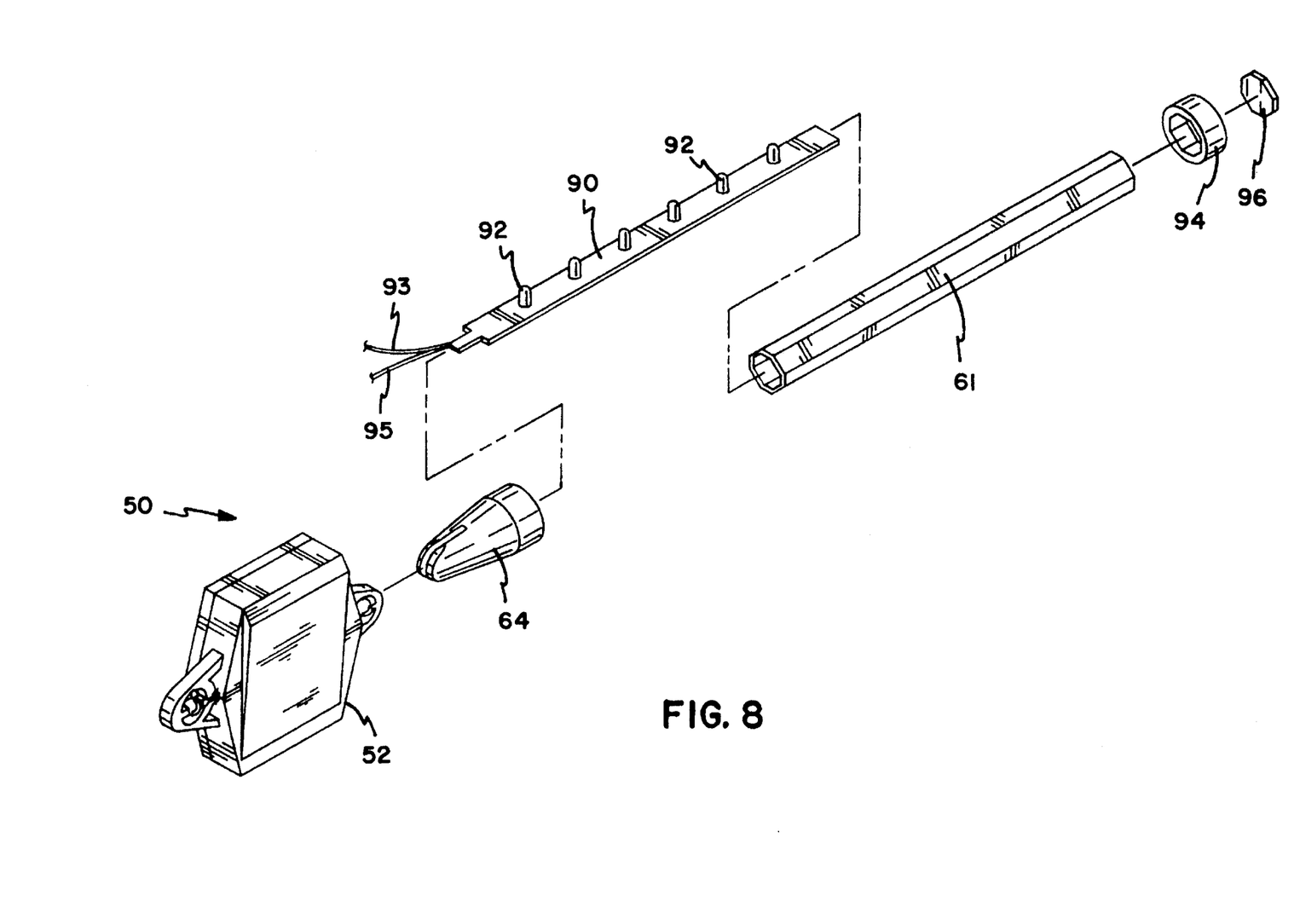
FIG. 8 is a partial, perspective, exploded view of the rear safety lighting device of FIG. 2.

A partial exploded view of the rear safety lighting device 50 is provided in FIG. 8, where LED 90 is provided as a light source. When negative lead 93 and positive lead 95 are in electrical connection to a power source, lights 92 on LED 90 give off illumination. If desired, this illumination can take the form of flashing or a constant radiation. LED 90 fits inside right refracting area 61 which is capped by cap 94 and end refractive lens 96. If desired, the LED can be replaced with a different light arrangement as would be apparent to one skilled in the art. This may be desirable, for example, if it is intended to direct light out of refractive lens 96.

The materials which may be used in constructing the safety lighting device of the present invention include known engineering plastics as well as other materials such as metal, glass and ceramic. The only criteria for selecting the a particular material is that it must be capable of functioning properly in its intended position. For example, the refractive material should be transparent plastic or glass, and the electric circuit material should be sufficiently conductive. Accordingly, one skilled in the art would readily appreciate those materials which are appropriate for use in the present invention.

Figure 9:
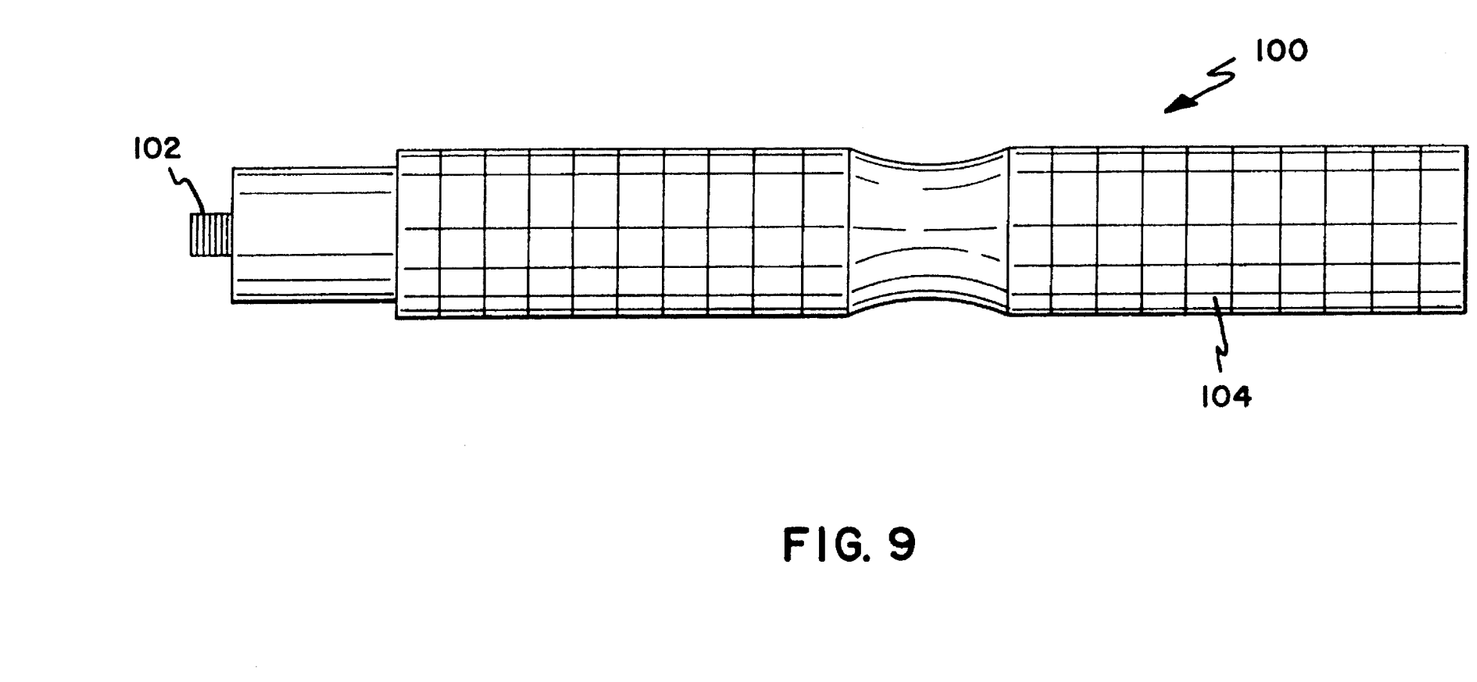
FIG. 9 is an alternative embodiment of a safety lighting device according to the principles of the present invention.
Figure 10:
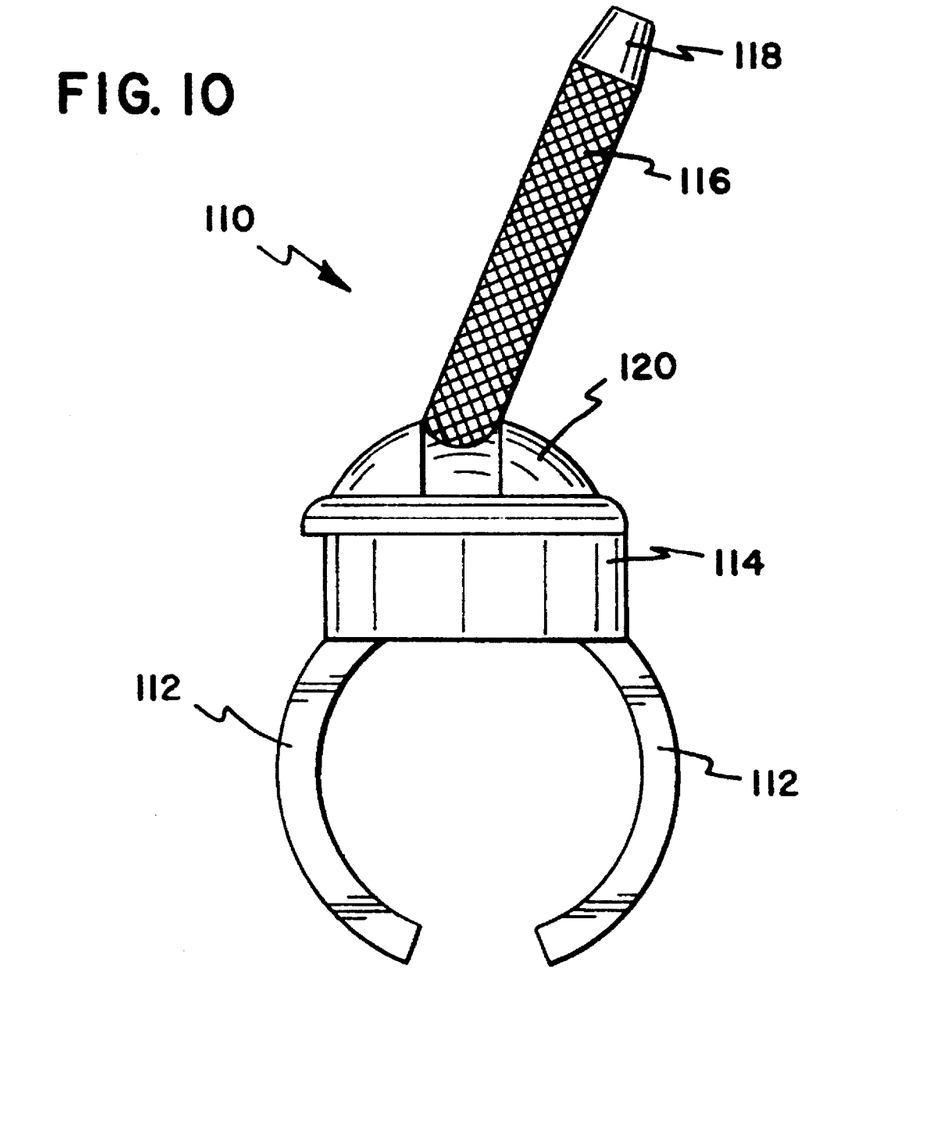
FIG. 10 is another alternative embodiment a safety lighting device according to the principles of the present invention.

Alternative embodiments of the present invention are identified in FIGS. 9 and 10. In FIG. 9, a safety lighting device 100 which may be attached to the turn signal outlets of a motorcycle or adapted to fit onto a boat or jet ski at contact fitting 102. Constant and/or flashing light could radiate from elongated arm 104 to provide increased visibility. The front and rear of the device 100 can provide different lighting arrangements. In FIG. 10, a safety lighting device 110 which can be attached to a person's extremity or torso by straps 112 is provided. Straps 112 are preferably Velcro type straps. Battery pack base unit 114 is provided as an energy source, and lights elongated arm 116 to provide illumination. Cap 118 is provided which rotates to switch on and off the light. An additional flashing position can be provided. The elongated arm 116 can rotate is several directions on a ball joint (not shown) under swivel cover 120. Preferably, the elongated arm 116 is about 4 to 10 inches in length.

What is claimed is:

1. A safety lighting device comprising:

a base for attachment to an object;

a first elongated illuminatable section pivotably attached to said base, said elongated illuminatable section comprising a light source and an illuminatable tube, said light source being circuitly connected to an energy source to provide illumination, and said illuminatable tube comprising a cylinder of scatter refractive material to refract illumination from said illuminatable tube; and a second elongated illuminatable section pivotably attached to said base, said second elongated illuminatable section comprising a second light source and a second illuminatable tube, said second light source being circuitly connectable to an energy source to provide illumination, said second illuminatable tube comprising a cylinder of scatter refractive material to refract illumination from said illuminatable tube, wherein said second elongated illuminatable section can pivot between an open portion and a closed position.

2. The safety lighting device according to claim 1, wherein said elongated illuminatable section can pivot between an open position and a closed position.

3. The safety lighting device according to claim 1, further comprising a releasable fastener for releasably attaching said safety lighting device to an object.

4. The safety lighting device according to claim 1, wherein said elongated illuminatable section can be detached upon impact and reattached to said base.

5. The safety lighting device according to claim 1, wherein said light source further comprises a flasher.

6. The safety lighting device according to claim 1, wherein said flasher provides a turning signal indication.

7. The safety lighting device according to claim 1, wherein said safety lighting device is water resistant.

8. The safety lighting device according to claim 1, wherein said light source provides a variable intensity light.

9. A method for increasing the visibility of a vehicle comprising attaching the device according to claim 1 to said vehicle.

10. The method according to claim 9, wherein said vehicle comprises a bicycle, a motorcycle, a boat, or a jet-ski.

\* \* \* \* \*